Patented Oct. 24, 1933

1,932,341

UNITED STATES PATENT OFFICE 1,932,341

BASIC ESTER OF FATTY-AROMATIC ACIDS AND PROCESS FOR OBTAINING THE SAME

Marcus Guggenheim, Basel, Switzerland, assignor to Hoffmann-La Roche Inc., Nutley, N. J., a corporation of New Jersey No Drawing. Application March 16, 1933, Serial No. 661,179, and in Germany March 22, 1932

10 Claims. (Cl. 260—103)

The esters of aminoalcohols of the general formula

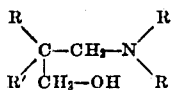

wherein R represents an alkyl and R' an alkyl or hydrogen, with aromatic acids are very strong local anæsthetics.

It has now been found that, as was to be expected, in the fatty-aromatic esters of these aminoalcohols the locally anæsthesizing action is almost obliterated. On the other hand they possess a very strong antispasmodic action, which in some of the compounds even surpass the action of papaverine. These esters, which are obtained in the usual manner, are colorless oils, some of which distil without decomposition. Their salts are for the most part easily soluble in water. They are to be applied in medicine.

The aminoalcohols used as starting materials may be prepared from the aminoaldehydes (obtained according to the processes described in the United States Patent No. 1,824,676) by reduction with sodium amalgam in slightly acetic acid solution.

Example 1

15.9 parts by weight of 2.2-dimethl-3-diethl-amino-propanol are diluted with 50 parts by weight of benzene and dropped into a solution of 15.5 parts by weight of phenyl-acetyl-chloride in about 50 parts by weight of benzene. Considerable heat is developed by the reaction and the product is kept gently boiling for 3 hours. After cooling, the reaction product is shaken with dilute hydrochloric acid, the acid solution is quickly treated with ether, sodium carbonate solution added to the aqueous layer and the oil thus separated taken up with ether. After drying and distilling off the ether the residue is distilled. 21 parts by weight of 1-phenyl-acetyl-2.2-dimethyl-3-diethylamino-propanol are obtained in the form of an oil boiling at 173–174° C. under 12 mm pressure. The hydrochloride is obtained by neutralizing the base in absolute alcohol with alcoholic hydrochloric acid and removing the solvent in vacuo. The oily residue crystallizes some time after in rosettes of needles melting at 80° C.

The 1-phenyl-acetyl-2.2-dimethyl-3-diethyl-aminopropanol is represented by the following formula

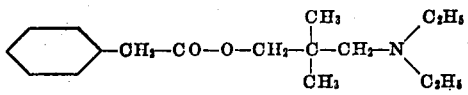

Example 2

The α-phenyl-butyryl ester of 2.2-dimethyl-3-diethylaminopropanol is obtained from α-phenyl-butyryl-chloride and the aminoalcohol according to the method described in Example 1. It can be distilled in high vacuum (B. P. 147° C. at 0.03 mm).

The salts react neutrally. They do not crystallize and are easily soluble in water.

The α-phenyl-butyryl ester of 2.2-dimethyl-3-diethylaminopropanol is represented by the following formula

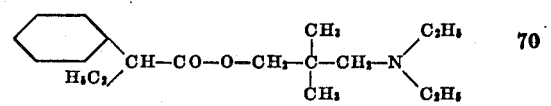

Example 3

The solutions of 27.3 parts by weight of phenyl-bromoallyl-acetyl-chloride and of 15.9 parts by weight of 2.2-dimethyl-3-diethylamino-propanol in 120 parts by weight each of benzene are mixed and kept boiling for 3 hours. Then the hydrochloride is separated by shaking with water and from the aqueous solution the free base is precipitated with sodium carbonate solution. After drying, the base is distilled in high vacuum (B. P. 186° C. at 0.03 mm). The phenyl-bromo-allyl-acetyl-2.2-dimethyl-3-diethylamino-propanol is thus obtained in the form of an oil of alkaline reaction. With acids it forms neutral salts, which are easily soluble in water.

The phenyl-bromo-allyl-acetyl-2.2-dimethyl-3-diethyl-aminopropanol is represented by the following formula:

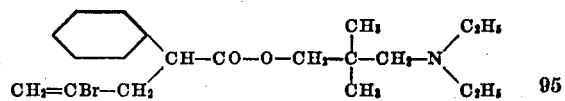

Example 4

From 18 parts by weight of tropic acid (α-phenyl-β-hydroxy-propionic acid) the acetyl-tropyl-chloride is prepared in the usual manner, it is then diluted with three times its volume of benzene and 15.9 parts by weight of 2.2-dimethyl-3-diethylaminopropanol, diluted with 50 parts by weight of benzene, are added. The solution, which is being warmed by the reaction, is kept at 60–70° C. for 2 hours. After cooling the precipitated oily hydrochloride is taken up in a little water and a concentrated solution of potassium iodide is added. The hydriodide of the acetyl-tropyl-ester of 2.2-dimethyl-3-diethylaminopropanol is precipitated in the form of a slowly solidifying oil, which after recrystallization from a mixture of alcohol and ether forms colorless needles melting at 92° C.

The hydriodide of the acetyl-tropyl-ester of 2.2-dimethyl-3-diethylaminopropanol is represented by the following formula:

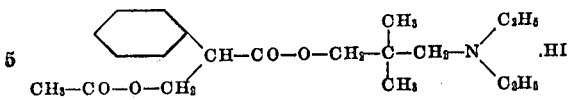

Example 5

10.7 parts by weight of atrolactic acid (α-phenyl-α-hydroxypropionic acid) are acetylated with 12 parts by weight of acetylchloride. After removing the excess of acetylchloride by distillation, the acetyl-atrolactic acid is transformed into the chloride in vacuo at 0° C. with 3 parts by weight of thionyl-chloride in benzene solution. The benzene solution of the raw acetyl-atrolactyl-chloride is, after having removed the unused thionylchloride, allowed to flow into a benzene solution of 8.44 parts by weight of 2.2-dimethyl-3-dimethylamino-propanol. After a few hours the acetyl-atrolactyl-2.2-dimethyl-3-dimethyl-amino-propanol-ester-hydrochloride is filtered by suction, washed with ether and recrystallized from a mixture of alcohol and ether. It forms colorless needles melting at 161° C. having a bitter taste. It is easily soluble in water and alcohol, difficultly soluble in ether. The aqueous solution, reacts neutral to litmus.

The acetyl-atrolactyl-2.2-dimethyl-3-dimethylaminopropanol-ester-hydrochloride is represented by the following formula:

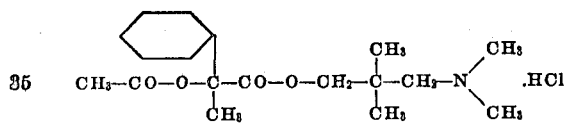

Example 6

15.5 parts by weight of 2.2-dimethyl-3-dimethylaminopropanol are dissolved in 65 parts by weight of benzene and a solution of 24 parts by weight of acetyl-mandelyl-chloride in 65 parts by weight of benzene are added. The precipitated hydrochloride of the ester is recrystallized from absolute alcohol.

The racemic acetyl-mandelic-acid - 2.2 - dimethyl - 3 - dimethylamino - propanol - ester-hydrochloride forms white crystals melting at 179°. It is easily soluble in water and rather so in alcohol, difficultly soluble in ether.

The acetyl-mandelic-acid-2.2-dimethyl-3-dimethylamino - propanol - ester - hydrochloride is represented by the following formula:

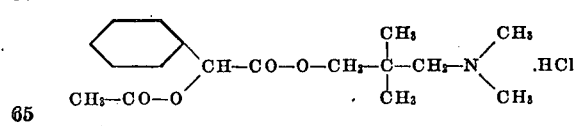

Example 7

The racemic propionyl-mandelic-acid-2.2-dimethyl - 3 - dimethylamino - propanol - ester-hydrochloride is prepared in the same manner as the compound described in Example 6. It may be recrystallized from isopropyl-alcohol and forms colorless rosettes melting at 139° C. They are easily soluble in water, difficultly soluble in ether.

The propionyl-mandelic-acid-2.2-dimethyl-3-dimethylamino-propanol-ester - hydrochloride is represented by the following formula:

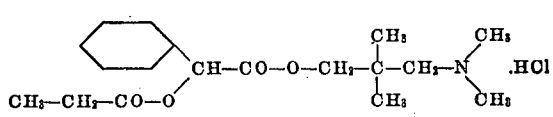

Example 8

49 parts by weight of acetyl-tropyl-chloride are dissolved in 63 parts by weight of toluol. While cooling with water, a mixture of 46 parts by weight of 2.2-dimethyl-3-benzylmethylamino-propanol and 40 parts by weight of toluol is added. After 3 hours heating to 50° C. the product is three times shaken with 100 parts by weight each of water, the aqueous solution is extracted with ether, freed from the dissolved ether by evacuation and treated with a solution of sodium iodide. The hydriodide is separated in the form of a thick oil. It is washed with a little water, made into a paste with water and sodium carbonate is added. The liberated base is taken up with ether. From the washed and dried ethereal solution the base is precipitated by evaporation in the form of a light yellow oil, which cannot be distilled. Its reaction is alkaline, and with acids it forms neutral salts, which are liquid and for the most part easily soluble in water.

The acetyl - tropyl - 2.2 - dimethyl - 3 - benzyl-methylamino-propanol is represented by the following formula:

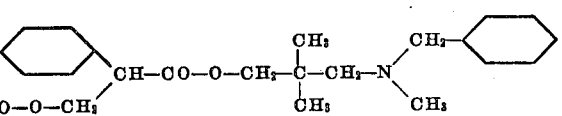

Example 9

49 parts by weight of acetyl-tropyl-chloride are dissolved in 110 parts by weight of chloroform and a mixture of 39 parts by weight of 2.2-dimethyl-3-piperidyl-propyl-alcohol and 60 parts by weight of chloroform is dropped in while cooling with water. The reaction product is heated during 3 hours to 50° C. and the yellow homogeneous solution is three times shaken with 100 parts by weight each of water. The aqueous solution is extracted with ether and freed from the dissolved ether by suction. A 50% solution of potassium iodide in water is added, until no more oil is precipitated. The oil is separated from the water, washed with a little water, made into a paste with water and sodium carbonate solution is added until the reaction becomes alkaline. The liberated base is taken up with ether. By evaporating the ether the reaction product is obtained in the form of a light yellow oil of alkaline reaction.

The acetyl - tropyl - 2.2 - dimethyl-3-piperidyl-propanol is represented by the following formula:

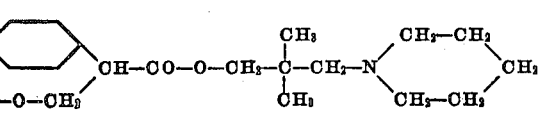

Example 10

15.7 parts by weight of benzilic-acid-methyl-ester (α, α-diphenyl-glycollic-acid-methyl-ester) and 31.1 parts by weight of 2.2-dimethyl-3-diethylamino-propanol are boiled together under a reflux condenser for 21 hours. The excess of aminoalcohol is removed by distillation in vacuo. The remaining brown oil is insoluble in water. It is taken up with alcohol, neutralized with alcoholic hydrochloric acid and the benzilic-acid-2.2 - dimethyl - 3 - diethylaminopropanol - ester-hydrochloride precipitated with ether. After recrystallization from isopropyl-alcohol it melts at 141–142° C., tastes bitter and dissolves easily in water.

The benzilic - acid - 2.2 - dimethyl - 3 - diethylamino - propanol - ester - hydrochloride is represented by the following formula:

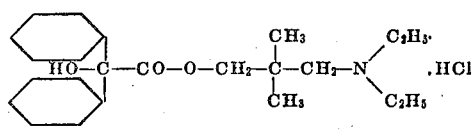

Example 11

13.0 parts by weight of benzilic-acid 2.2-dimethyl-3-diethylamino-propanol-ester and 4.5 parts by weight of dimethylsulphate are heated together for half an hour to 80–90° C. After cooling the syrup is several times stirred with dry ether, whereby the mass solidifies. It is recrystallized from isopropyl-alcohol. The benzilic-acid-2.2-dimethyl-3-methyldiethyl - ammonium-propanol - ester - methylsulphate crystallizes in colorless needles melting at 133–134° C.; it is easily soluble in water and alcohol, difficultly soluble in ether.

The benzilic - acid - 2.2 - dimethyl-3-methyldiethyl-ammonium-propanol-ester-methylsulphate is represented by the following formula:

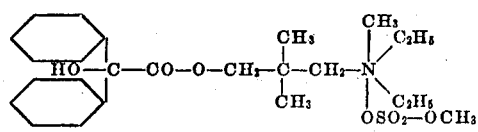

Example 12

22.6 parts by weight of acetyltropyl-chloride are in the course of half an hour, while stirring and cooling, added to a solution of 31.8 parts by weight of 2.2-dimethyl-3-diethyl-amino-propanol and the mixture is left to stand. After 24 hours the precipitated hydrochloride of the aminoalcohol is filtered by suction, the benzene solution of the acetyl - tropyl - 2.2 - dimethyl - 3 - diethylaminopropanol-ester extracted with 110 parts by weight of normal hydrochloric acid and the hydrochloric acid solution heated for 8 hours to 80° C. After cooling 11.5 parts by weight of sodium carbonate are added and the product shaken with ether. After drying the ethereal solution is completely evaporated. Thus 28 parts by weight of tropyl-2.2-dimethyl-3-diethylaminopropanol-ester are obtained in the form of a colorless thick oil.

The tropyl-2.2-dimethyl-3-diethylamino-propanol-ester is represented by the following formula:

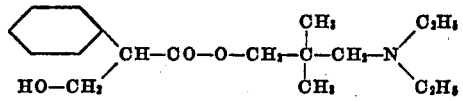

I claim:

1. The phenyl substituted fatty acid esters of aminoalcohols of the general formula

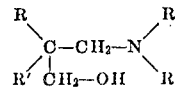

wherein R represents an alkyl and R' an alkyl or hydrogen, which substances form colorless oils insoluble in water, but readily soluble in organic solvents, their salts with acids being easily soluble in water, the said substances possessing a strong antispasmodic action.

2. The tropyl-esters of aminoalcohols of the general formula

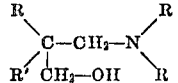

wherein R represents an alkyl and R' an alkyl or hydrogen, which substances form colorless oils insoluble in water, but readily soluble in organic solvents, their salts with acids being easily soluble in water, the said substances possessing a strong antispasmodic action.

3. The acetyl-tropyl ester of 2.2-dimethyl-3-diethylaminopropanol, which is a colorless oil insoluble in water, but readily soluble in organic solvents, its hydriodide melting at 92° C. and having a strong antispasmodic action.

4. The tropyl-ester of 2.2-dimethyl-3-diethylaminopropanol, which is a colorless oil insoluble in water, but readily soluble in organic solvents, forming easily soluble salts with acids and possessing a strong antispasmodic action.

5. The process for the manufacture of phenyl substituted fatty acid esters of aminoalcohols of the general formula

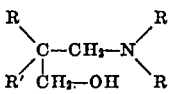

wherein R represents an alkyl and R' an alkyl or hydrogen, which consists in allowing an acylated ester of a phenyl substituted hydroxy fatty acid to react with said aminoalcohols.

6. The process for the manufacture of phenyl substituted fatty acid esters of aminoalcohols of the general formula

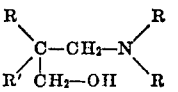

wherein R represents an alkyl and R' an alkyl or hydrogen, which consists in allowing acid chlorides of phenyl substituted fatty acid esters to react with said aminoalcohols.

7. The process for the manufacture of acetyl-tropyl-esters of aminoalcohols of the general formula

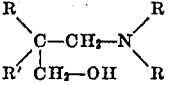

wherein R represents an alkyl and R' an alkyl or hydrogen, which consists in allowing acetyl-tropyl-chloride to react with said aminoalcohols.

8. The process for the manufacture of tropyl esters of aminoalcohols of the general formula

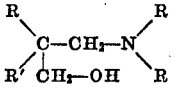

wherein R represents an alkyl and R' an alkyl or hydrogen, which consists in allowing acetyl-tropyl-chloride to react with said aminoalcohols and subsequent removal of the acetyl group.

9. The process for the manufacture of the acetyl-tropyl- ester of 2-2-dimethyl-3-diethyl-amino-propanol, which consists in allowing acetyl-tropyl-chloride to react with 2.2-dimethyl-3-diethylamino-propanol.

10. The process for the manufacture of the tropyl ester of 2.2-dimethyl-3-diethylamino-propanol, which consists in allowing acetyl-tropyl-chloride to react with 2.2-dimethyl-3-diethylamino-propanol and subsequent removal of the acetyl group.

M. GUGGENHEIM.